United States Patent [19]
Adams et al.

[11] Patent Number: 5,161,289
[45] Date of Patent: Nov. 10, 1992

[54] HEADER MACHINE

[75] Inventors: James W. Adams; Steven R. Cole; William D. Daggett, all of Memphis; Douglas B. Laird, Collierville, all of Tenn.; Larry Newsom, Sr., Byhalia, Miss.; John R. Strickland, Memphis, Tenn.; Jerry D. Thompson, Lamar, Miss.; Johnny L. Thurmond, Collierville, Tenn.

[73] Assignee: Ardco, Inc., Chicago, Ill.

[21] Appl. No.: 706,654

[22] Filed: May 29, 1991

[51] Int. Cl.$^5$ .............................. B23Q 41/06
[52] U.S. Cl. .................. 29/33 T; 364/474.02; 408/46
[58] Field of Search .......... 29/33 D, 33 T, 564, 29/26 A, 33 P; 208/42, 44, 46, 49; 364/474.02; 83/DIG. 2, 682, 409

[56] References Cited

U.S. PATENT DOCUMENTS

| | | | |
|---|---|---|---|
| 3,565,142 | 2/1971 | MacQueston | 408/46 X |
| 4,342,088 | 7/1982 | Sato | 364/474.02 |

FOREIGN PATENT DOCUMENTS

| | | | |
|---|---|---|---|
| 1273957 | 7/1968 | Fed. Rep. of Germany | 408/46 |
| 3814674 | 11/1989 | Fed. Rep. of Germany | 408/46 |
| 137819 | 10/1980 | Japan | 29/33 T |
| 308817 | 8/1971 | U.S.S.R. | 408/44 |
| 1164004 | 6/1985 | U.S.S.R. | 408/42 |

Primary Examiner—William Briggs
Attorney, Agent, or Firm—Walker, McKenzie & Walker

[57] ABSTRACT

A header machine for drilling specified hole patterns in pipe and for cutting the pipe to a specified length to form headers for use in heat transfer products. The header machine includes hold clamps for selectively holding the pipe during the processing of the pipe and feed clamps for selectively holding the pipe during the feeding thereof through the header machine. The feed clamps are mounted on a feed carriage which is movably mounted for movement forwardly and rearwardly. The feed carriage is driven by a stepper motor operably coupled to the feed carriage for moving the feed carriage and the pipe endwise to various drilling positions. The header machine also includes a spud drill for drilling spud holes in the pipe, a connection drill for drilling connection holes in the pipe, a circular saw for cutting the pipe to a specified length, and provisions for making double circuit patterns of the spud hole. The various movements of the components of the machine are computer controlled and with data concerning the parameters of the header to be processed being entered by the operator into the keyboard of the computer which automatically writes a program for controlling such movements of the components.

16 Claims, 6 Drawing Sheets

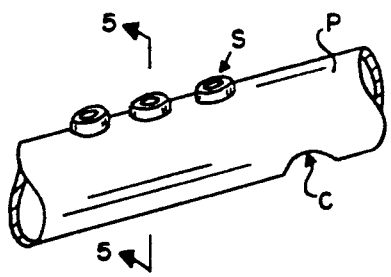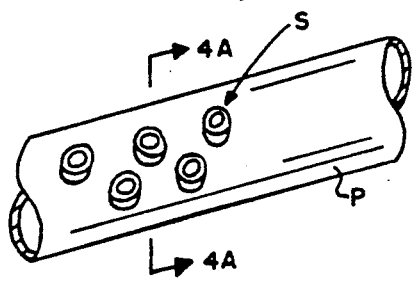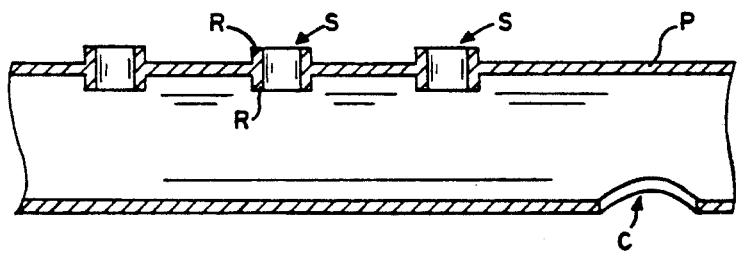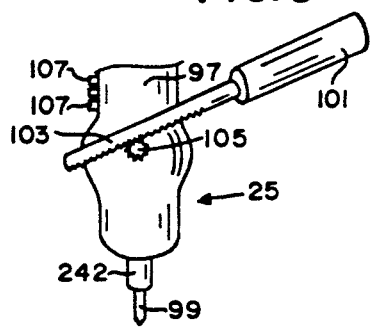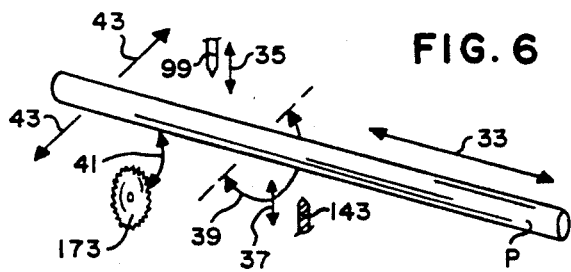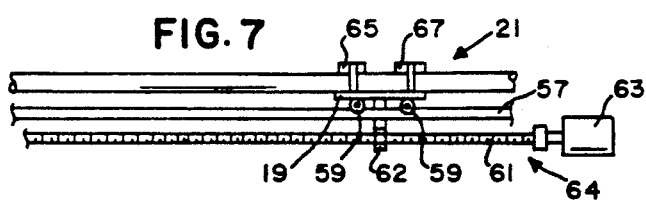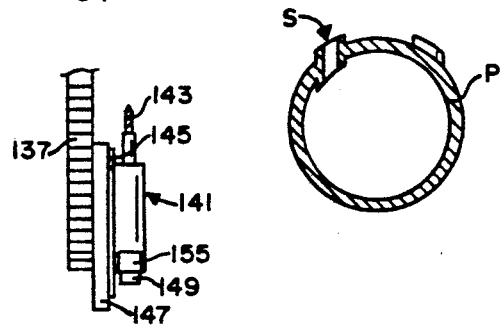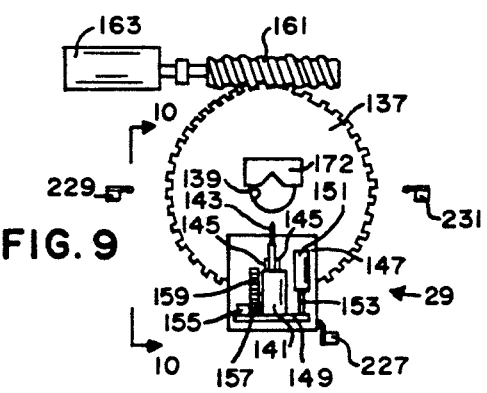

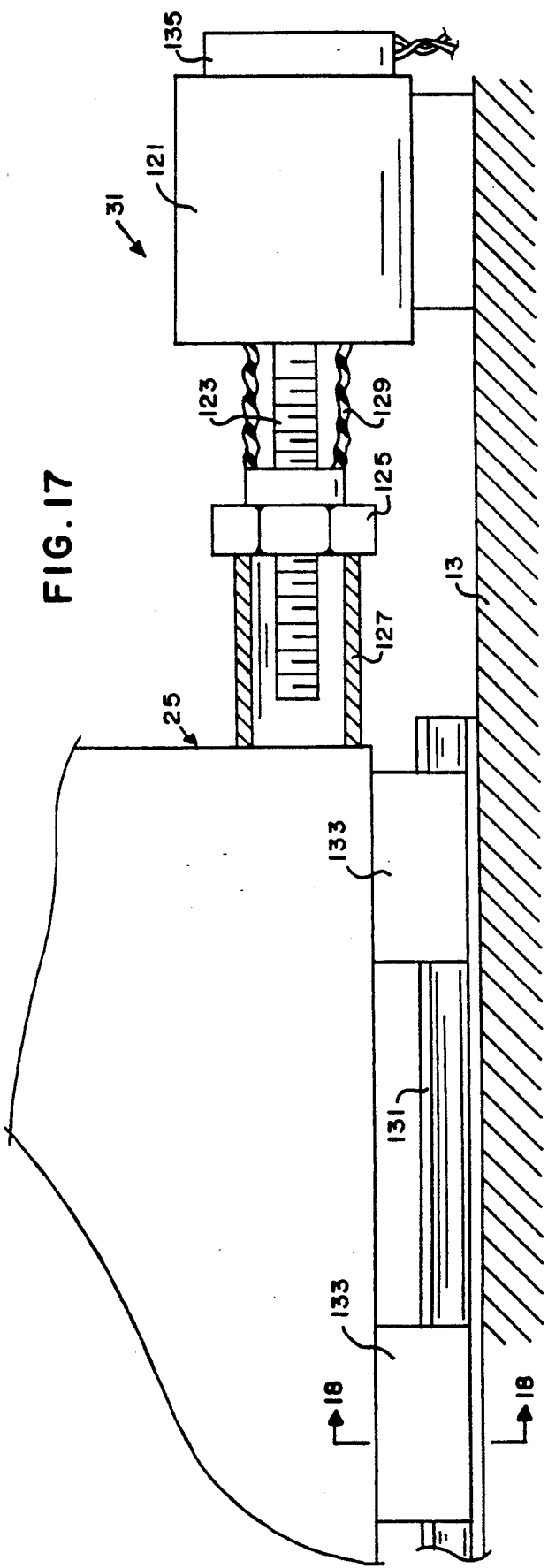

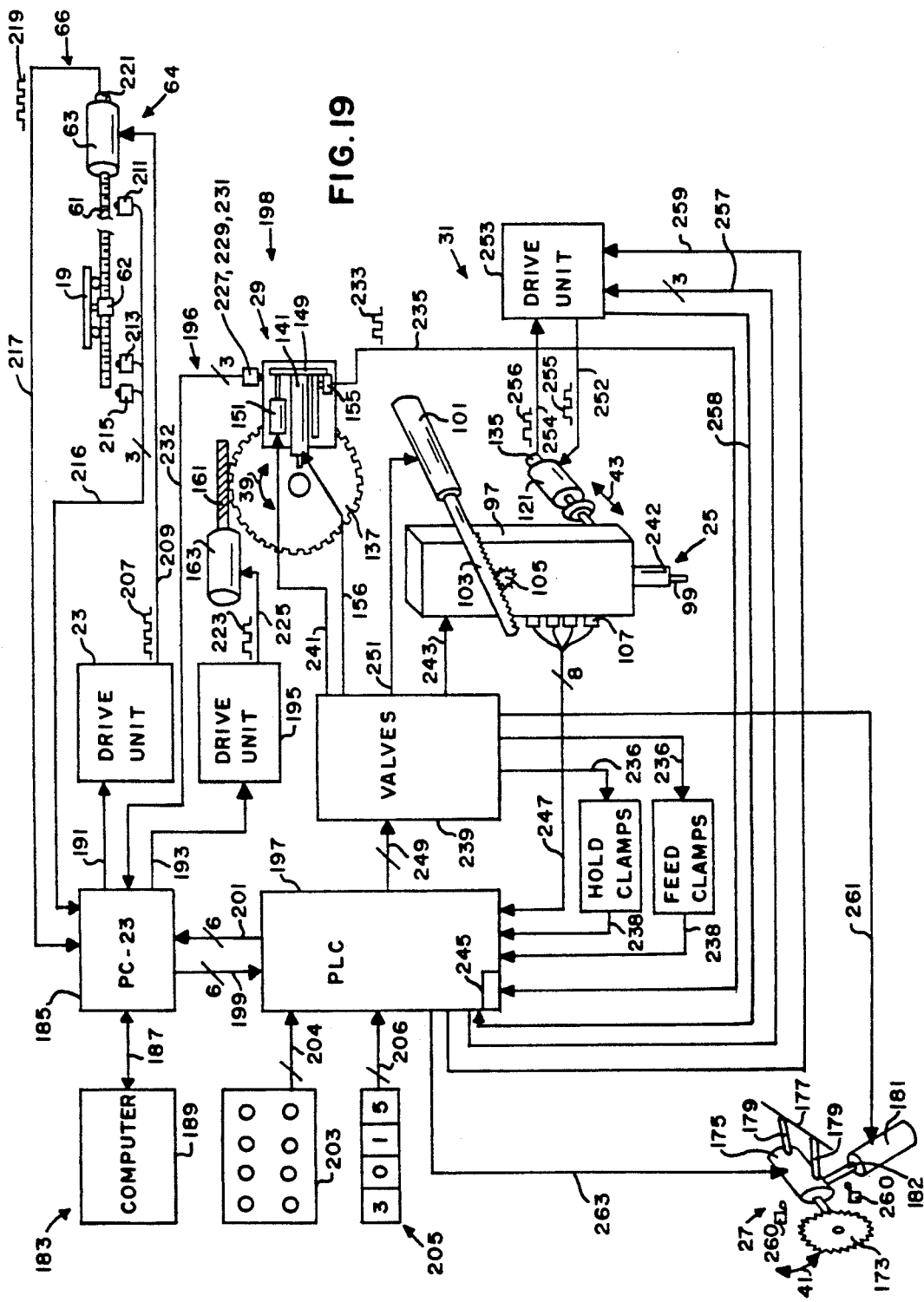

HEADER MACHINE

BACKGROUND OF THE INVENTION

1. Field of the Invention

The present invention relates, in general, to a header machine for drilling specified hole patterns in pipe and for cutting the pipe to a specified length to form a header for use in heat transfer products.

2. Information Disclosure Statement

A preliminary patentability search has been conducted class 29, subclasses 890.052 and 890.035, and class 408, subclasses 32, 33, 34, 26 and 28, and disclosed the following patents, some of which may relate to the present invention: Huet, U.S. Pat. No. 3,022,811, issued Feb. 27, 1962; Vierstraete, U.S. Pat. No. 3,685,915, issued Aug. 22, 1972; and Spitzmesser et al., U.S. Pat. No. 4,896,410, issued Jan. 30, 1990.

Huet discloses a machine for the manufacture of tube necks on headers. The machine includes a wall piercing punch which remains fixed and immobile within the header while an outer die is applied against the outside of the header and by coming down on the punch presses the wall of the header against the fixed punch.

Vierstraete discloses an apparatus for machining elongated work pieces for producing apertures in profiled members and sheet material. The apparatus includes a support on which the work pieces to be machined are supported, and above which there is disposed a portal member spanning the work piece and embodying a tool-carrying cross member having suitable driving tool spindles. The cross member, which may carry drills or the like, is operable towards the work piece by means of hydraulic piston devices. The position of the portal member is adjustable and located by measuring means.

Spitzmesser et al discloses a method of assembling a plurality of microtubes rigidly into position so as to facilitate their rapid interference pressing into metallic header tubestrips.

Additionally, the usual means of providing holes, such as so called "spud" holes and connection holes, in pipe to form headers for use in heat transfer products, is by the use of manually operated drills using jigs and the like, whereby the holes are typically drilled one at a time and the accuracy of the alignment of the holes leave a great deal to be desired. In fact, in the assembling of the headers with the tubes of associated cooling coils, it is usually necessary, due to the mechanical tolerances involved, to braze pieces of pipe onto the spud holes and then bend the pipe pieces so that they will line up with the tubes of the cooling coils for the brazing thereof. This additional brazing and bending is a slow and tedious manual process.

SUMMARY OF THE INVENTION

The present invention is directed toward providing a computer controlled machine that drills specified hole patterns in pipe and cuts the drilled pipe to length to form a header for use in heat transfer products.

One of the objects of the present invention is to provide such a machine that drills the holes with great precision and accuracy. This provides many advantages over previous means for manufacturing heat transfer products. For example, with the use of the present invention, the spud holes are so precisely sized and located that the pieces of pipe that were previously brazed into place during the assembly of the headers with the cooling coil tubes, as above described, can now be eliminated. Thus, the cooling coil tubes can be slipped directly into the spud holes. Additionally, because there is less brazing, the finished product has a neater appearance, fewer connections are necessary, and time is saved.

A further object of the present invention is to provide such a header machine in which so called "double circuit" holes, i.e., staggered spud holes, can be accurately formed. Thus, these double circuit holes can be formed with precision using the present header machine despite the difficulty in drilling at the glancing angle that is required, especially on small pipes where the holes, because of their transverse spacing, are on the sides of the pipe.

A further object of the present invention is to provide such a header machine which reduces the amount of pipe which is used by the machine in forming the headers so that a maximum number of headers may be formed from a given length of pipe.

A further object of the present invention is to provide such a header machine which has a high throughput rate and yet produces headers in which the holes are accurately sized and located.

A further object of the present invention is to provide such a header machine which is safe in operation and can be operated by a single individual.

BRIEF DESCRIPTION OF THE DRAWINGS

FIG. 3 is a perspective view showing a pipe having spud holes and a connection hole therein formed by the header machine of the present invention.

FIG. 4 is a perspective view showing a pipe having double circuit spud holes therein formed by the header machine of the present invention.

FIG. 4A is a sectional view taken as on the line 4A—4A of FIG. 4.

FIG. 5 is an enlarged sectional view taken as on the line 5—5 of FIG. 3.

FIG. 6 is a diagrammatic view showing the various axes of movement of various components of the header machine of the present invention.

FIG. 7 is a diagrammatic view of a portion of that shown in shown in FIG. 2.

FIG. 8 is a diagrammatic view of the spud drill means of the present invention for forming the spud holes in a pipe being processed.

FIG. 9 is a diagrammatic view of the means of the present invention for forming the connection holes in a pipe being processed.

FIG. 10 is an enlarged side view of a portion of that shown in FIG. 9, taken along the line 10—10 of FIG. 9.

FIG. 17 is a side elevational view of the mounting and driving means for the double circuit means of the present invention.

FIG. 19 is an operational diagram of the control means of the present invention showing the connection therewith of various components of the machine of the present invention.

DESCRIPTION OF THE PREFERRED EMBODIMENT

Figure 1:
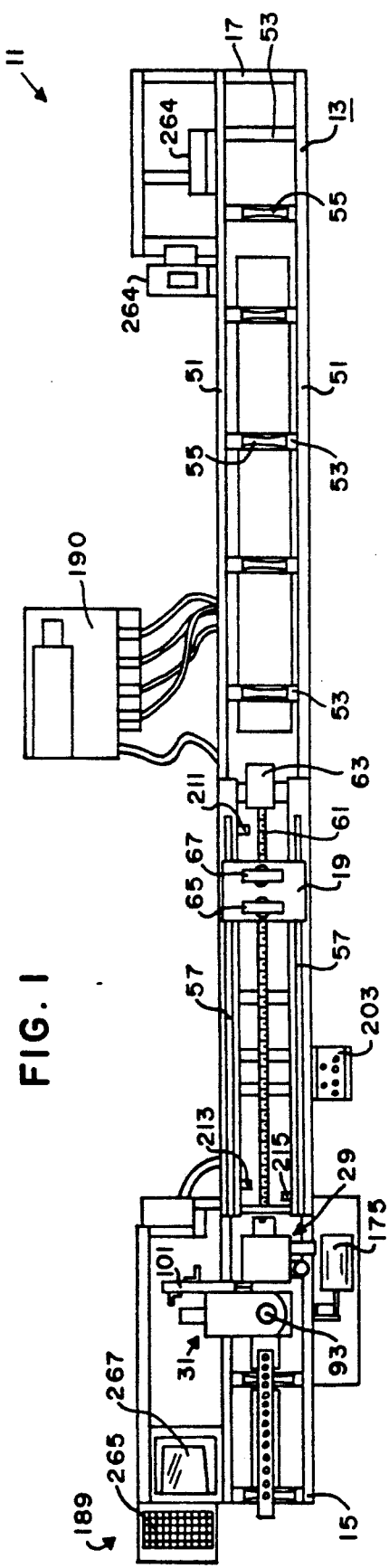
FIG. 1 is a top plan view of the header machine of the present invention.

The header machine 11 of the present invention includes, in general, a machine base 13 having a forward end 15 and a rearward end 17; a feed carriage 19 movably mounted along a portion of the top side of machine base 13 for selective forward movement towards forward end 15 and rearward movement towards rearward end 17; feed clamp means 21 mounted on feed carriage 19 for selectively clamping and unclamping a pipe P to be processed by header machine 11; a first drive control means or unit 23 operably coupled to feed carriage 19 for moving the feed carriage into selected positions to carry a pipe P into corresponding selected positions to be processed including one or more drilling positions; and first or spud drill means 25 movably mounted from machine base 13 for drilling spud holes S in pipe P when feed carriage 19 and pipe P carried thereby is in selected ones of said drilling positions. In addition, header machine 11 preferably includes a cut-off saw means 27 for cutting off the end of pipe P and for establishing the desired length of the header H. Also, header machine 11 includes a connection drill means 29 for making connection holes C with one of such holes being shown in FIGS. 3 and 5. Additionally, double circuit means 31 is preferably provided to form a double row of staggered spud holes S as shown in FIG. 4.

There are six axes of movement involved in the header machine 11 (see FIG. 6) which include a feed axis 33, a spud drill axis 35, a connection drill axis 37, a connection rotation axis 39, a saw swing axis 41, and a double circuit axis 43.

The mechanical operation of the machine involves various selected movements along the above mentioned six axes by various portions of the header machine 11 instigated by various drive and control means to be described later in the specification.

Machine base 13 is elongated and preferably is of opened framework construction including vertical members 45 supported from a suitable supporting surface 47, intermediate horizontal members 49, top horizontal members 51 and transverse members 53. Members 49, 51 are fixedly connected to vertical members 45 and transverse members 53 are fixedly connected at the opposite ends thereof to horizontal members 49, 51 by suitable means to establish the rigid elongated machine base 13.

A plurality of concave rollers 55 are rotatably supported from transverse members 53 in spaced relationship along the length of base 13 from adjacent the rearward end 17 to a place adjacent the middle thereof.

Figure 2:
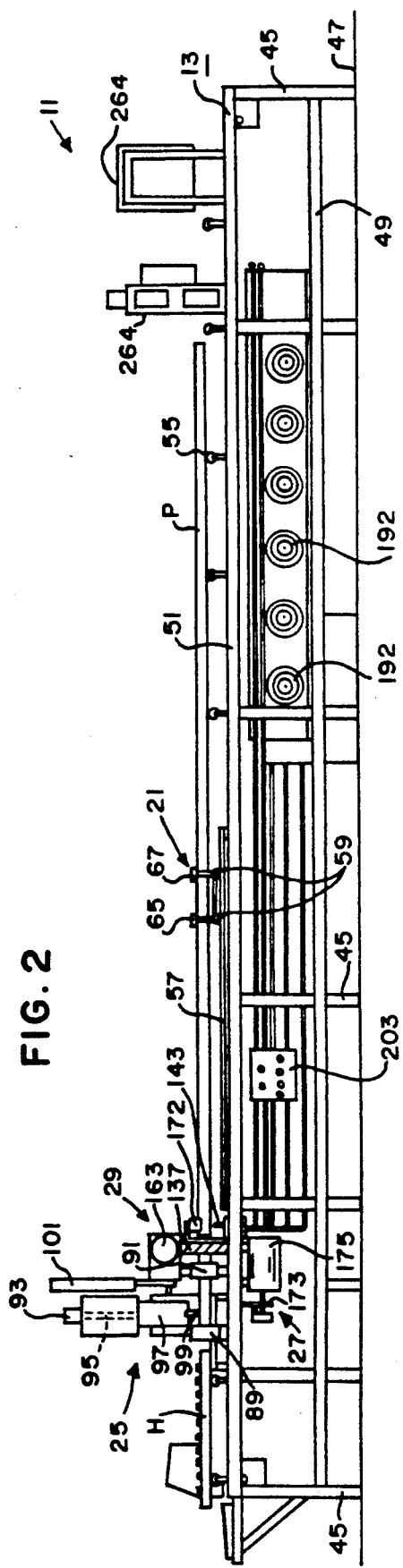
FIG. 2 is a side elevational view thereof and showing a pipe in position to be processed by the header machine.

Rollers 55 are adapted to movably support the pipe P adjacent the rearward part thereof, as best seen in FIG. 2 as the pipe is fed endwise to the left as viewed in FIG. 2.

A pair of parallel rails 57 are fixedly supported on the top of machine base 13 and upon which is movably mounted feed carriage 19 by suitable means as rollers 59 or the like, as best seen in FIGS. 2 and 7.

Feed carriage 19 is movable forwardly and rearwardly by means of a ball lead screw 61 operably coupled to feed carriage 19 by suitable means well known to those skilled in the art such as by nut 62 threadedly engaged with lead screw 61 and attached to carriage 19. A reversible electric feed stepper motor 63 turns the lead screw 61 to cause movement of the feed carriage 19 selectively either forwardly or rearwardly in the manner now well known to those skilled in the art and may be driven at various velocities, and accelerated or decelerated at various rates by control means later to be described in the specification. Stepper motor 63 is preferably a CompuMotor Model A/AX 106-205 stepper motor, manufactured by Parker Hannifin Corp., 1179 N. McDowell Blvd., Petaluma, CA 94952. It will be understood that feed stepper motor 63, ball lead screw 61, and nut 62 establish a first actuating means 64 operably coupling first drive control unit 23 to feed carriage 19, as will be better understood in the description to follow later in the specification. It will also be understood that first drive control unit 23 and first actuating means 64 together comprise feed carriage positioning means 66 for moving feed carriage 19 into selected positions in a manner hereinafter described.

Feed clamp means 21 preferably includes a forward feed clamp 65 and a rearward feed clamp 67 supported by feed carriage 19. Forward and rearward feed clamps 65, 67 are substantially identical and the following description of forward feed clamp 65 will suffice for both (see FIGS. 11, 12). Feed clamp 65 includes an upper clamp block 69 having a downwardly facing clamping face 71 and a lower clamp block 73 having an upwardly facing clamping face 75. Clamp blocks 69, 73 are mounted from feed carriage 19 by means of bolts 77 threadedly engaged in threaded sockets 78 in feed carriage 19. Bolts 77 extend downwardly through openings in an upper plate 79, clamp block 69, and clamp block 73. An air cylinder 81 is fixedly secured to upper plate 79 by suitable means, such as by bolt 82, and the piston rod 83 of air cylinder 81 extends to and operates against upper clamp block 69, in a manner well known to those skilled in the art, for causing downward movement of the upper clamp block 69 from an unclamped position shown in solid lines in FIG. 11 to a closed position shown in broken lines in FIG. 11. Springs 85 are interposed on bolts 77 between clamping blocks 69, 73 to urge the feed clamp 65 into said unclamped position upon release of air pressure from air cylinder 81. Suitable spacers 87 are preferably provided between lower clamp block 73 and feed carriage 19 to properly position the clamping faces 71, 75 relative to the longitudinal center line of the pipe P. It will be understood that the clamp blocks 69, 73 do not touch but are spaced apart when the feed clamp 65 is in said clamped position. Thus, the clamping faces 71, 75 are each somewhat less than 180 degrees and do not form a complete circle when in the clamped position. It will also be understood that the size of the opening defined by clamping faces 71, 75 is different for different sizes of pipe, thereby requiring that the clamp blocks 69, 73 be changed for different sizes of pipes as part of the set-up by the operator for each job. Clamping faces 71, 75 are preferably of an arcuate shape, as shown, to securely hold pipe P. The arcuate shape, rather than the well known "V" shape often used in gripping clamps, is necessary to avoid deforming the soft copper walls of pipe P.

Hold clamp means, preferably including forward and rearward hold clamps, 89 and 91, respectively, is preferably provided for securing pipe P during drilling, sawing, and the "hold and regrip" sequence, all hereinafter described. The forward hold clamp 89 and rearward hold clamp 91 are each substantially identical to the above described forward feed clamp 65, whereby the description of forward feed clamp 65 should suffice for both forward hold clamp 89 and rearward hold clamp 91. The only difference is that hold clamps 89, 91 are preferably mounted upside down from that shown in FIG. 11 and clamp block 73 is preferably provided with notches, not shown, in face 75 to accommodate any protrusions on pipe P such as spud holes S which already might have been formed in the pipe P when gripped by the hold clamps 89, 91.

Spud drill means 25 includes a hydraulic motor 93 having a shaft 95 which drives suitable gears well known to those skilled in the art in gear box 97, which in turn drives a spud drill bit 99 at high speed.

Suitable means well known to those skilled in the art is provided for moving drill bit 99 vertically and preferably includes a hydraulic cylinder 101 actuating a rack 103 which engages a pinion 105 that is operably coupled to the gears, not shown, in the interior of gear box 97 in a manner well known to those skilled in the art to selectively move the drill bit 99 upwardly or downwardly. Thus, movement of rack 103 in one direction will cause pinion 105 to rotate in one direction and raise spud drill bit 99 and movement of the rack in the opposite direction will cause opposite rotation of pinion 105 and lowering of the spud drill bit 99.

Figure 13:
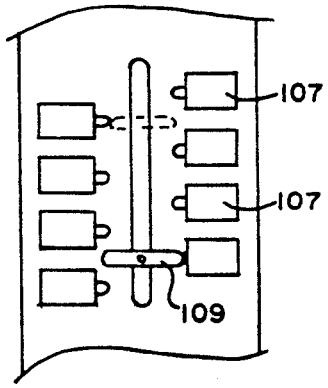
FIG. 13 is a diagrammatic view showing the limit switches and the actuating means thereof for the spud drill means of the present invention.

Sensing means which is preferably in the form of multiple limit switches 107 (see FIG. 13) is provided for sensing the vertical position of spud drill bit 99. The limit switches 107 are fixedly mounted by suitable means well known to those skilled in the art adjacent the gear box 97 and an actuator arm 109 which is attached to a portion of the mechanism in gear box 97 and moves up and downwardly with the spud drill bit 99 in a manner well known to those skilled in the art. It will be understood that actuator arm 109, as it moves upwardly and downwardly, contacts the fixedly mounted limit switches for the actuation thereof, thereby allowing the vertical position of drill bit 99 to be monitored.

Figure 14:
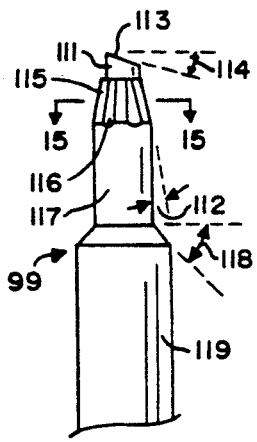
FIG. 14 is an enlarged side elevational view of a portion of the spud drill bit.
Figure 15:
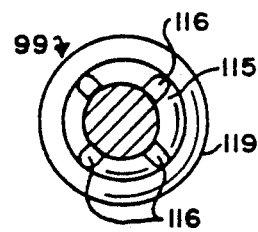
FIG. 15 is an enlarged sectional view taken as on the line 15—15 of FIG. 14.

The details of the construction of spud drill bit 99 is best seen in FIGS. 14 and 15, wherein it will be seen that end 111 is of a diameter smaller than the remainder of the drill and has a sloped face 113 defined by angle 114. Spud drill bit 99 has a flared portion 115 that leads, at an angle 112, to an intermediate portion 117 and then, at an angle 118, to an enlarged portion 119. Flared portion 115 has a plurality of flattened portions 116 thereon which swage copper from pipe P as drill bit 99 penetrates the pipe wall. When spud drill bit 99 is moved downwardly into the pipe P (which is typically copper) while rotating at a high speed (preferably 3300 RPM), the end 111 first penetrates the pipe P and then the flared portion 115, along with the high speed of the drill bit 99, as it swages through the pipe, causes a melting buildup of copper to form around the spud holes S, thereby creating a rim R which extends both into the interior of the pipe P and to the exterior thereof, as best seen in FIGS. 3 and 5.

Many header applications require double row drilling of the spud holes in a staggered relationship, as best seen in FIGS. 4 and 4A. The spud holes S in the double row are drilled alternately in each of two parallel rows located on either side of the longitudinal axis of the pipe and will herein be referred to as the "double circuit" feature. The structure, or double circuit means 31, which accomplishes this double circuit feature preferably includes a stepping motor 121 (see FIG. 17) which is mounted on machine base 13 and which rotatably drives a ball lead screw 123 extending through the usual nut member 125 that is fixedly attached to spud drill means 25 by a pipe 127 that surrounds a portion of the ball lead screw to prevent contamination of the ball lead screw. Also, a rubber boot 129 extends between the nut member 125 and stepper motor 121 for the same purpose as pipe 127. Spud drill means 25 is movably mounted for movement transverse of machine base 13 by means of a pair of parallel rails 131 anchored to machine base 13 transversely thereof and upon which ride bearing blocks or runners 133 that are fixedly attached to drill means 25.

The above described ball rail system, which includes ball bearings 132 which recirculate within passageways 134, and which is well known to those skilled in the art, is rigid for loads in excess of 100,000 pounds to alleviate problems of rigidity of spud drill means 25 when the double circuit holes S are drilled towards the edge of the pipe P. Without a rigid system, it would be hard to force the spud drill bit 99 into a precise place on the pipe because of the glancing angle of the spud hole with respect to the pipe, as seen in FIG. 4A, causing the drill bit to tend to "walk" out of position, especially on small pipes where the double circuit spud holes are on the sides of the pipe. A ball rail system suitable for this application is manufactured by Nook Industries, Inc., 23200 Commerce Park Road, Cleveland, OH 44122-5869.

A suitable sensing means well known to those skilled in the art monitors the motion of lead screw 123. Preferably the sensing means is an encoder 135, well known to those skilled in the art, attached to the shaft of motor 121.

Connection drill means 29 preferably includes a ring gear 137 having a hole 139 centrally thereof through which the pipe P extends during the processing thereof. Ring gear 137 is rotatably mounted from machine base 13 by suitable means well known to those skilled in the art with the axis of rotation thereof being along the longitudinal axis of the pipe P to be processed. Connection drill means 29 also includes a drill 141, which preferably includes a stepped drill bit 143. Drill 141 is movably mounted by suitable means now well known to those skilled in the art for movement of drill bit 143 axially of ring gear 137 and preferably includes one or more trapezoidal shaped slide rails 145 fixedly attached to a plate 147 which in turn is fixedly attached to the ring gear 137. A bar 149 is fixedly attached to drill 141 for simultaneous movement therewith.

A pneumatic cylinder 151 is fixedly attached to plate 147. Pneumatic cylinder 151 includes a piston rod 153 that is fixedly attached to bar 149 so that as the piston rod 153 is retracted, the drill bit 143 moves towards and into contact with a pipe P for the drilling of the connection holes C, and when the piston rod 153 is extended, the drill bit 143 moves away from the pipe P with this movement of the drill bit 143 being done at appropriate times as determined by the control means to be described later in the specification.

A suitable sensing means well known to those skilled in the art monitors the motion of drill 141. Preferably the sensing means is in the form of a well known encoder 155 mounted on bar 149 which is driven by a pinion gear 157. A gear track or rack 159 is fixedly attached to plate 147 and engages pinion gear 157 so that as the drill bit 143 moves in and out relative to the pipe P along the axis 37, pinion gear 157 is caused to be turned, allowing encoder 155 to sense the position of the drill bit 143 in a manner that will now be apparent.

The angular position of drill bit 143 relative to pipe P is established by the position of ring gear 137 which is positioned by suitable means, preferably a worm gear 161 engaging the teeth of ring gear 137. Worm gear 161 is driven by suitable well known means, preferably a stepper motor 163, such as a CompuMotor Model A/AX 106-205 stepper motor, manufactured by Parker Hannifin Corp., 1179 N. McDowell Blvd., Petaluma, CA 94952.

Figure 16:
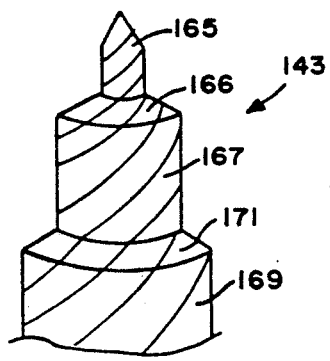
FIG. 16 is an diagrammatic view of a portion of the connection drill bit.
Figure 18:
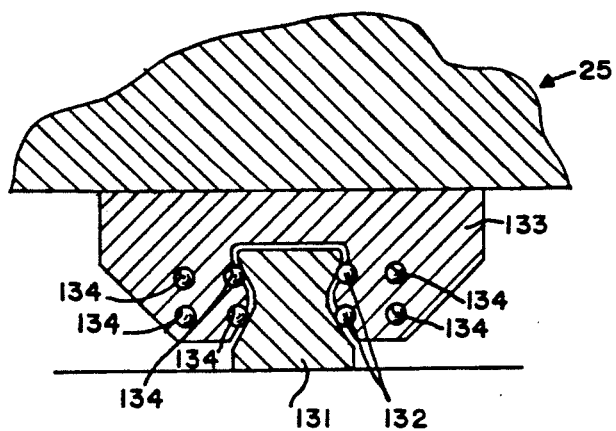
FIG. 18 is an enlarged sectional view taken as on the line 18—18 of FIG. 17.

Drill bit 143 is of well known construction and preferably includes a small pilot drill portion 165, an intermediate portion 167 connected to portion 165 by a sloping portion 166, and a large portion 169 connected to intermediate portion 167 by sloping portion 171. By having a stepped drill bit 143 as shown in FIG. 16, different size connection holes C on the same header H may be formed by appropriate choice of drill depth. It will be understood that varying the drill depth of drill bit 143 to accomplish variously sized connection holes is only possible on pipes with sufficiently large inner diameters so that pilot drill portion 165 does not protrude through the opposite wall of the pipe from that having the connection holes. On small pipes, drill bit 143 may be a standard, non-stepped, drill bit of single diameter, without sloping portions 166, 171. A V-shaped saddle 172 is positionably attached to ring gear 137 by suitable well known means in a location on the opposite side of pipe P from drill bit 143 to act as a back up or stabilizing means for pipe P when it is being drilled.

Cut-off saw means 27 preferably includes a circular saw blade 173 which is rotatably driven by an electric motor 175, which motor in turn is pivotally mounted on machine base 13 about a pivot axis 177 by suitable means as arms 179 which are swingable about the pivot axis 177 and fixedly attached to motor 175. A hydraulic cylinder 181 that includes piston rod 182 operably attached to motor 175 moves cut-off saw blade 173 perpendicularly across the longitudinal axis of movement of pipe P to cut off the pipe. In other words, at the appropriate time, the cut-off saw blade 173 is caused to swing into the pipe P for making a cut to sever the pipe P and then caused to swing outwardly away from engagement with the pipe P.

Referring now to FIG. 19 wherein is provided an operational diagram of the control means 183 for controlling the operation of header machine 11 showing the connection with various components of the header machine. In the preferred embodiment, operation of control means 183 is directed by a controller or interface card 185, preferably a personal computer interface card such as the CompuMotor Model PC-23 controller manufactured by Parker Hannifin Corp., 1179 N. McDowell Blvd., Petaluma, CA 94952. Signal lines 187 are the edge connectors between the interface card 185 and the computer 189 to which card 185 is interfaced.

It will be understood that suitable power supply lines and electrical power sources, not shown, well known to those skilled in the art, are provided for furnishing electrical power to the various components of control means 183. Also, a suitable hydraulic system 190, well known to those skilled in the art, is provided for furnishing hydraulic fluid to various mechanical components, as needed, with cooling fans 192 provided to cool the hydraulic fluid. In addition, a suitable air supply means, not shown, well known to those skilled in the art is provided for furnishing air to other of the mechanical components, as needed.

Leading from interface card 185 are serial lines 191, which are standard RS-232 lines that lead to a suitable first drive control unit 23 for communication therewith. In the preferred embodiment, first drive control unit 23 is a CompuMotor "A-Series" microstepping drive control unit manufactured by Parker Hannifin Corp., 1179 N. McDowell Blvd., Petaluma, CA 94952, chosen for compatibility with stepper motor 63. Also, leading from interface card 185 preferably are RS-232 serial lines 193 which lead to a suitable second drive control unit 195. In the preferred embodiment, second drive control unit 195 is also a CompuMotor "A-Series" microstepping drive control unit, chosen for compatibility with stepper motor 163. Commands go out over the serial lines 191, 193, preferably in ASCII code, in a command language well known to those skilled in the art called "X" language, the command protocol used by drive control units 23 and 195. It will be understood that connection drill stepper motor 163, worm gear 161, and ring gear 137 establish a second actuating means 196 operably coupling second drive control unit 195 to connection drill means 29, as will be better understood in the description to follow later in the specification. It will also be understood that second drive control unit 195 and second actuating means 196 together comprise connection drill rotation means 198 for rotatably positioning connection drill means 29 at various selected angles in a manner hereinafter described.

Both the first and second drive control units 23, 195 and a programmable logic controller (PLC) shown as at 197, operate as slaves to the interface card 185 which is a master. PLC 197 is a suitable programmable logic controller, which in the preferred embodiment is a General Electric "Series One Plus" PLC, manufactured by G.E. FAUC Automation North America, Inc., P.O. Box 8106, Charlottesville, VA 22906. First and second drive control units 23, 195 and PLC 197 can do no operations on their own. In other words, the drive control units 23, 195 and PLC 197 are simply awaiting commands from interface card 185. A plurality of command lines, such as the six command lines 199, pass command information from the interface card 185 to PLC 197. Similarly, from the PLC 197 to the interface card 185 there are corresponding acknowledgement signals, such as the six acknowledgement lines 201, that indicate that the requested operations have been done. For example, interface card 185 might tell the PLC 197 to raise the connection drill 141; the interface card 185 will then pause until told by the PLC 197 that the operation has been completed. Thus, it will be understood that there is a computer within the PLC 197 that awaits commands, and, when it gets them, it performs them and passes back an acknowledgement to the interface card 185, which has its own computer.

In addition, PLC 197 also in particular points in its program by means well known to those skilled in the art can monitor the manual operator panel 203 through input lines 204. PLC 197 also similarly monitors the thumbwheel switches 205, well known to those skilled in the art, through input lines 206. Thus, thumbwheel switches 205 provide inputs to PLC 197 and can be set as required by the operator to match the particular specified parameters of the pipe P. For example, the first two switches, which for illustration purposes show "30" in FIG. 19, indicate the diameter of a 3.0 inch pipe P. It is necessary for the diameter of the pipe P to be set so that the connection drill 141 and the spud drill means 25 know how deep to drill the pipe P. The last two numbers of thumbwheel switches 205 are arbitrary codes ranging from 00 to 99, and those numbers, depending on the particular code chosen, indicate whether a "double circuit" is to be drilled, and, if a double circuit is to be drilled, encode all of the required double circuit information (such as spacing, whether to begin on the left or right row, etc.).

It will be understood that the basic controller for the entire header machine 11 is the interface card 185. On the hierarchical control level below the interface card 185 are the first drive control unit 23, the second drive control unit 195 and the PLC 197. The first drive control unit 23 receives commands over line 191 and then sends out stepping pulses 207 over line 209 to feed stepper motor 63, which in turn rotates the lead screw 61 and moves feed carriage 19.

There are three switches 211, 213 and 215 which are monitored by the interface card 185 through input lines 216. Switch 213 is a homing switch against which carriage 19 initially "homes", while switches 211, 215 are limit or over-travel switches for carriage 19, all operating in a well known manner.

Since there is a possibility that the feed carriage 19 can become bound and miss stepper motor pulses going out on line 209, the feed stepper motor 63 is run closed-loop with the interface card 185 through the feedback line 217 on which pass pulses 219 from a sensing means, preferably a well known encoder 221, which monitors the rotation of ball lead screw 61 (and thereby monitors the movement of carriage 19).

The second drive control unit 195 sends pulses 223 over line 225 to stepper motor 163 which drives worm gear 161 and in turn drives the ring gear 137. This second drive control unit 195 runs open-loop, as there is little possibility of binding of the ring gear 137 during rotation since it is not in contact with the pipe as it rotates.

There are three switches 227, 229, 231 sensing the position of connection drill means 29 (see FIG. 9) and monitored by interface card 185 through input lines 232. Switch 227 is located at the home or center position of the ring gear 137, switch 229 is located at one of the 90 degree motion points and switch 231 is located at the other 90 degree motion point of the ring gear 137. The switches 227, 229, and 231 are shown somewhat diagrammatically in FIG. 9 and are supported from machine base 13 by suitable means well known to those skilled in the art so that the plate 147 contacts switch 227 to actuate the switch when the ring gear 137 is in the home position shown in FIG. 9. When the ring gear is in a position rotated 90 degrees clockwise from that shown in FIG. 9, plate 147 contacts switch 229 and when the ring gear 137 is in a position rotated counter-clockwise from that shown in FIG. 9, plate 147 contacts switch 231.

As the pneumatic cylinder 151 extends and retracts causing the bar 149 and the connection drill 141 to move inwardly and outwardly relative to the ring gear 137, the pinion gear 157 rotates as it engages with track or rack 159 causing the encoder 155 to turn sending pulses 233 back along line 235 to PLC 197. To monitor the encoder 155 on the connection drill 141 through lines 235, a high speed counter 245 within PLC 197 records pulses from encoder 155, which PLC 197 then reads to determine the inward and outward position of the connection drill 141. Thus it will be understood that the system relative to the inward and outward movement of connection drill means 29 hereinabove described is a closed-loop system that is closed around the PLC 197.

PLC 197 controls, using output lines 249, solenoid actuated valves of suitable construction well known to those skilled in the art and indicated generally as at 239. Thus, PLC 197 controls selected ones of valves 239 which in turn control the air flow to and from the pneumatic cylinder 151 over the lines shown symbolically as at 241, which moves bar 149 and the associated components heretofore described, and which in turn causes the encoder 155 to move. In addition, one or more of valves 239 control the air to the connection drill 141 itself over line 156. It will be understood that not only do some of the valves 239 control the air flow, but also some of the valves 239 control hydraulic fluid flow, as described for the control of other components herein referred to.

Selected ones of valve 239 control the hydraulic fluid to cylinder 101, shown symbolically flowing through lines 251, and thus the motion of the rack 103 that moves the spud drill 242 up and down, thereby also moving spud drill bit 99. The hydraulic fluid for driving hydraulic motor 93 which rotates the spud drill 242 itself is transmitted over the lines symbolically shown as at 243.

Figure 11:
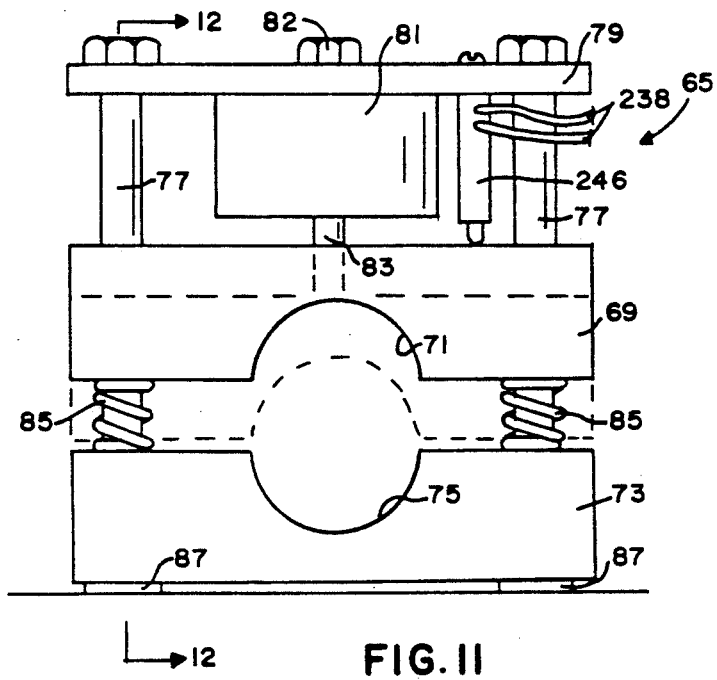
FIG. 11 is an end elevational view of one of the clamps of the header machine of the present invention.
Figure 12:
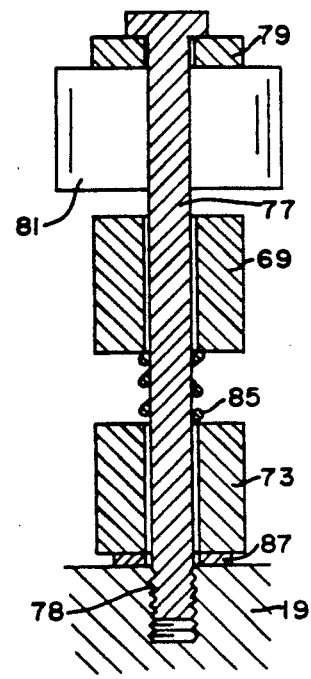
FIG. 12 is a sectional view taken as on the line 12—12 of FIG. 11.

Similarly, one or more valves 239 selectively pass air, symbolically shown going over lines 236, to air cylinders 81 which operate hold clamps 89, 91 and feed clamps 65, 67 (see also FIGS. 2 and 11). In addition, there is a switch 246 to indicate when each particular hold and feed clamp is closed, monitored by PLC 197 over input lines 238.

Referring again to the spud drill means 25 and the switches 107 in connection therewith, the PLC 197, depending on the pipe diameter that has been set by the thumbwheel switches 205, makes the choice over lines 247 of which switches 107 to examine for the upper and lower limits of travel of spud drill 242. For example, if a large pipe is to be drilled, the uppermost switch 107 and the third uppermost switch 107 may be picked. On the other hand, if a small pipe is to be drilled, the two lowermost switches might be picked. In other words, the program of PLC 197 makes the decision based on thumbwheel switches 205 which switches 107 to test for upper and lower limits and the PLC 197 activates selected ones of valves 239 to control the travel of spud drill 242. This is again a closed loop system in which the motion is monitored through switches 107. The upper limit chosen is selected to be the position with the spud drill bit 99 located just over the pipe P, for minimum travel time of the bit to reach pipe P, while the lower limit chosen is selected to be the required spud drill bit depth to properly form a spud hole, with the wall of pipe P passing to a certain point on intermediate portion 117 of spud drill bit 99. By thus minimizing the travel distance of spud drill bit 99 on each hole, a maximum throughput rate may be achieved.

In addition, a double circuit feature is provided for the spud drill means 25. The double circuit means 31 which includes stepper motor 121 causes the double circuit motion, that is, along the double circuit axis 43 shown in FIGS. 6 and 19. The double circuit motion is controlled by third drive control unit 253 which in the preferred embodiment is a CompuMotor "AX Series" drive control unit, manufactured by Parker Hannifin Corp., 1179 N. McDowell Blvd., Petaluma, CA 94952. Stepper motor 121, chosen for compatibility with third drive control unit 253, is preferably a CompuMotor Model A/AX 106-205-E stepper motor, also manufactured by Parker Hannifin Corp. The main difference between the third drive control unit 253 and first and second drive control units 23, 195 is that the third drive control unit 253 not only sends out pulses 255 over line 252 to stepper motor 121, but also monitors pulses 256 over input line 254 from third drive control unit encoder 135 itself, operating in a closed-loop feedback mode to control the rotation of stepper motor 121.

The motion for the double circuit is much more limited than any of the other motions heretofore described and the particular drive control unit chosen for drive control unit 253 has seven possible movement commands that can be given to it, although only five are used in header machine 11. Also, it can be preprogrammed or configured internally by use of an erasable programmable read only memory (EPROM) to perform a selected one of the five motions to control the various double circuit motions, namely, offset left ¾", offset left ⅜", center drill, offset right ⅜", and offset right ¾". These offset distances refer to the transverse offset of the spud drill from the longitudinal axis of pipe P. It should also be understood that drive control unit 253 preferably may have limit switches, not shown, located at either ends of travel of spud drill 25, as well as a "home" switch, also not shown, which may locate the longitudinal center axis of pipe P, each switch operably connected to drive control unit 253 in a manner well known to those skilled in the art.

Command lines 257 permit the encoding of eight different numbers, 0 to 7, which represent the desired double circuit motion command from PLC 197 to third drive control unit 253. Once this command has been set up properly by the PLC 197, trigger line 259 is then activated by PLC 197, telling third drive control unit 253 to perform the motion indicated on lines 257. A handshake signal coming from third drive control unit 253 on line 258 back to PLC 197 indicates that the desired double circuit motion has been completed so that the PLC 197 can, in turn, handshake back to interface card 185.

Referring now to cut-off means 27, hydraulic cylinder 181 is controlled from one or more of valves 239 by PLC 197 which causes the cut-off saw 173 to move up or down as hydraulic fluid is caused to flow through lines 261 to cylinder 181.

Similarly there are limit switches 260, shown symbolically in FIG. 19 and operably connected, through input lines, not shown, to PLC 197, allowing cut-off saw 173 to indicate when it is in its two extreme positions so that the PLC 197, once it commands through one or more valves 239 and lines 261, will know when these commands have been completed. There is also a line 263 coming from PLC 197 causing electric motor 175 of the cut-off saw mean 27 to selectively turn off and on for the stopping and rotation thereof.

For convenience, one or more cabinets 264 (see FIGS. 1 and 2) may be provided to house PLC 197, drive control units 23, 195, and 253, as well as any motor starter circuitry that may be required by hydraulic system 190 or cooling fans 192.

Turning now to computer 183, the operator enters parameters to the computer from the order for the header or headers H to be manufactured. For example, the order might specify distance between spud holes S, length of header H, connection hole C at a particular place, double circuit, etc. In other words, the operator enters on the keyboard 265 of computer 189 the data necessary to fill a particular order for headers H. Upon the entering of this data, by means well known to those skilled in the art, a program on computer 189 automatically writes another or second program that is going to be loaded into the interface card 185 and executed by the computer thereon. For example, to put the correct distance between spud holes S, some question relative thereto is asked the operator on the computer screen 267 and he will answer that question by typing in the answer on the keyboard 265. The computer 189 then generates the above mentioned second program, preferably in "X" language, that indicates different motions, distances, etc. that will be loaded into the memory of the interface card 185, as for example by pressing the appropriate key on keyboard 265. Once the program is loaded into the interface card 185, the computer 189 gives the command to the interface card 185 to begin the order. It should be noted that, since interface card 185, once loaded, may operate independently of computer 189, orders may be prepared on computer 189 while an order is presently being processed by interface card 185.

Figure 20:
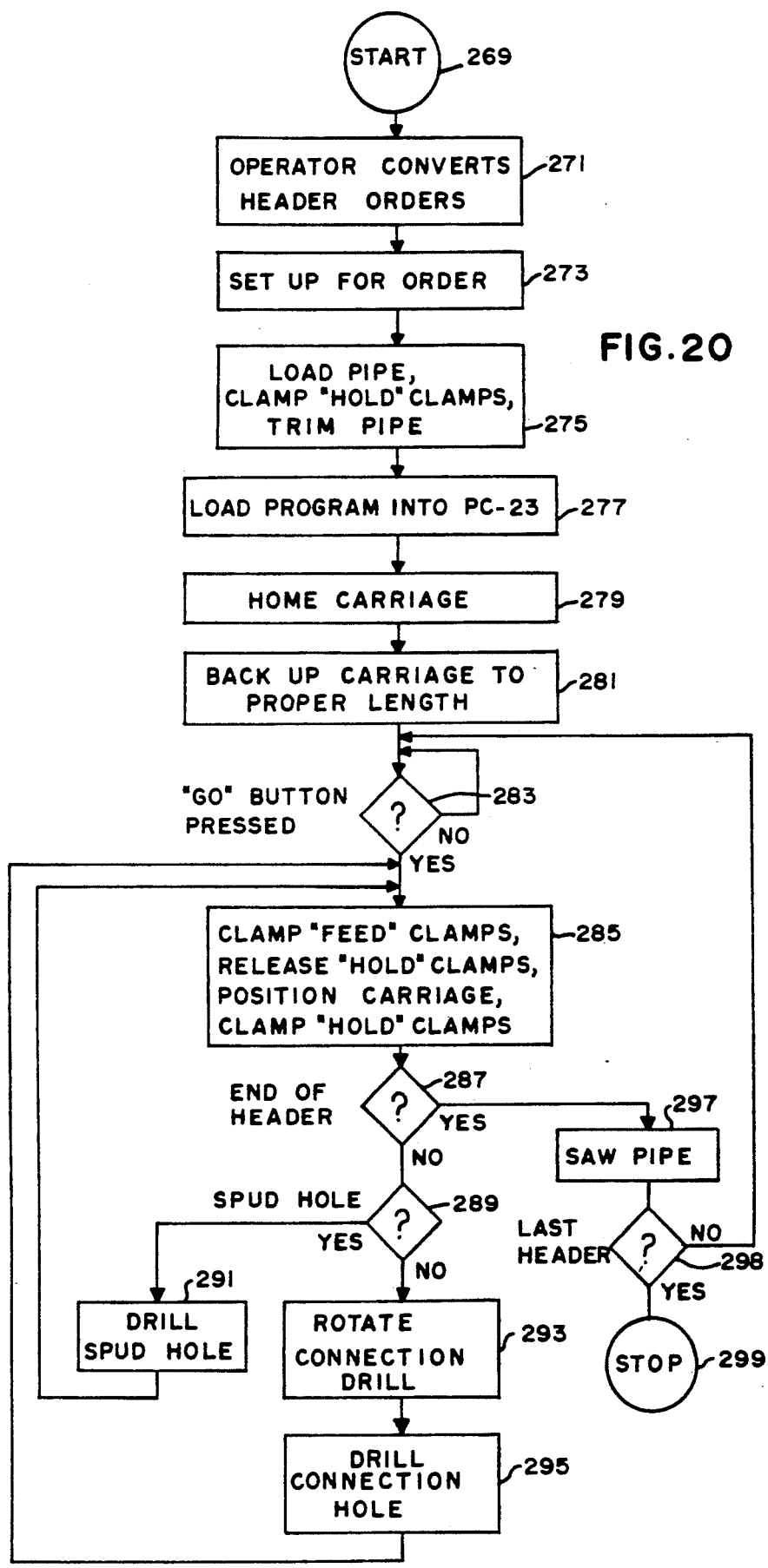
FIG. 20 is a functional diagram or flow chart showing the sequence of functions in the operation of the header machine of the present invention.

Referring now to the flow chart of FIG. 20, header order processing begins at "start" symbol 269. In the operation symbolized by block 271, the operator converts the header orders. This is an interaction with the computer 189 by the operator where he enters the data for the header orders, as discussed above, which is then converted into a program for use by interface card 185.

Next, in the operation symbolized by block 273, hold clamps 89, 91, feed clamps 65, 67, saddle 172, spud drill bit 99, and connection drill bit 143 are changed by the operator to their proper sizes as required by the particular order. Then, as symbolized by block 275, a pipe P is put into the header machine 11, that is, pipe P is placed on the rollers 19, as best seen in FIG. 2, with the pipe P extending through the hole 139 in ring gear 137 hold clamps 89, 91 are manually clamped and the pipe P is trimmed by pushing a button on operator panel 203 which causes the cut-off saw means 27 (which is located between hold clamps 89, 91) to cut off the end of the pipe P. Trimming the end of the pipe establishes a known location of the pipe end at the saw blade.

The next operation, symbolized by block 277, is to load the program, previously generated in block 271, from the computer 189 into the interface card 185 and begin executing that program by interface card 185.

The program first "homes" feed carriage 19 as symbolized by block 279. In this operation the feed carriage 19 is moved slowly towards the ring gear 137 until home switch 213 is actuated. Also, connection gear 137 is homed, that is, it is moved to its center position, as is double circuit means 31. Next, as symbolized by block 281, the feed carriage 19 is backed up some length with hold clamps 89, 91 still clamped and feed clamps 65, 67 still released. At this point, interface card 185 waits, as a safety feature, for the operator to press the "go" button on the operator panel 203.

The program keeps looping at decision box 283 until the "go" button is pressed, at which time the operation proceeds to the next functions symbolized by block 285. In this step, the feed clamps 65, 67 are clamped, the hold clamps 89, 91 are released, feed carriage 19 is positioned for the first operation and then the hold clamps 89, 91 are clamped so that the pipe P is now anchored on two ends, i.e., by the feed clamps 65, 67 and hold clamps 89, 91. Next, if the header H is not finished, tested at block 287, then a decision is made at block 289 as to whether a spud hole is to be drilled. If a spud hole is to be drilled, the spud hole S is drilled as symbolized by the block 291. If the spud hole is not to be drilled, and a connection hole is to be provided, the connection drill means 29 is rotated to its proper position as symbolized by the block 293 and the connection hole C is drilled as symbolized by the block 295. Then after drilling the connection hole C, the program proceeds back through the operational loop again to block 285 and the process is repeated. Eventually, at some point, a "hold and regrip" sequence will be needed as the feed carriage 19 comes too close to the ring gear 137. When carriage 19 hits home switch 213 while feeding pipe in block 285, the program will suspend forward movement of carriage 19, clamp the hold clamps 89, 91, release the feed clamps 65, 67, and move carriage 19 rearwardly. Since pipe P is being held by hold clamps 89, 91, it will not move, and carriage 19 will move a chosen distance along pipe P, obtaining another length of pipe to feed. At the completion of this rearward motion, feed clamps 65, 67 will reclamp, hold clamps 89, 91 will release, thus terminating the "hold and regrip" sequence, and forward feeding of pipe will resume. In this manner, a long continuous section of pipe, longer even than machine 11, can be accommodated in a straightforward manner. It is the operator's responsibility to put enough pipe into the machine to complete the order that he has entered on the computer 189 so he can complete one order with the pipe that is in the header machine 11.

If the header is completed when the test at block 287 is made, the pipe is then sawed at block 297 and a check is made for the end of the order at block 298. If the order is complete, the program then terminates at symbol 299. If, however, more headers remain to be fabricated, the program proceeds back through the operational loop again to block 283 and waits for the "go" button to be pressed again.

From the foregoing, it will be understood that the present invention provides a header machine that drills spud holes and connection holes with great precision and accuracy. Further, such a machine is provided which is capable of excellent quality and drastically increased production over previous header production techniques.

Although the present invention has been described and illustrated with respect to a preferred embodiment and a preferred use therefor, it is not to be so limited since modifications and changes can be made therein which are within the full intended scope of the invention.

We claim:

1. A header machine for drilling specified hole patterns in pipe to form a header for use in heat transfer products, said header machine comprising:

(a) a machine base;
(b) a feed carriage movably mounted on said machine base for movement forwardly and rearwardly relative to said machine base;
(c) clamp means mounted on said feed carriage for selectively clamping and unclamping a pipe to be processed by said header machine;
(d) first drill means movably mounted from said machine base for drilling spud holes in the pipe;
(e) feed carriage positioning means for positioning said feed carriage, said feed carriage positioning means comprising a first drive control unit and first actuating means operably coupling said first drive control unit to said feed carriage for moving said feed carriage into selected positions to carry the pipe into chosen positions for drilling by said first drill means to form one or more spud holes in the pipe, said first actuating means including a feed stepper motor and a ball lead screw operably coupling said feed stepper motor to said feed carriage;
(f) computer control means operably coupled to said feed carriage positioning means for controlling the movement of said feed carriage, said computer control means including computer means for receiving data relative to the parameters of a header order to be processed by the header machine and for creating a program from such data, said computer means further including interface card means responsive to said program and operably coupled to said first drive control unit for directing the movement of said feed carriage;
(g) connection drill means movably mounted on said machine base for selectively drilling one or more connection holes in the pipe, said connection drill means including connection drill rotation means for rotatably positioning the connection drill means, said connection drill rotation means comprising a second drive control unit and second actuating means operably coupled to said second drive control unit for rotating said connection drill means to a selected angle around the longitudinal axis of the pipe for drilling a connection hole at said selected angle, said interface card means being operably coupled to said second drive control unit for directing the rotation of said connection drill means, said second actuating means including a connection drill stepper motor, a worm screw driven by said connection drill stepper motor, and a ring gear engaged by said worm screw; and
(h) double circuit means for moving said first drill means in a selected pattern to form a double circuit pattern of spud holes in the pipe.

2. A header machine for drilling specified hole patterns in pipe to form a header for use in heat transfer products, said header machine comprising:

(a) a machine base;
(b) a feed carriage movably mounted on said machine base for movement forwardly and rearwardly relative to said machine base;
(c) feed clamp means mounted on said feed carriage for selectively clamping and unclamping a pipe to be processed by said header machine;
(d) hold clamp means mounted on said machine base for holding the pipe during the processing of the pipe;
(e) first drill means movably mounted on said machine base for drilling spud holes in the pipe;

(f) connection drill means mounted on said machine base for selectively drilling one or more connection holes in the pipe, said first drill means being movably mounted for independent movement to a selected angle around the longitudinal axis of the pipe and with respect to said connection drill means; and (g) feed carriage positioning means for moving said feed carriage into selected positions to carry the pipe into chosen positions for drilling by said first drill means to form one or more spud holes in the pipe.

3. The header machine of claim 2 which includes connection drill rotation means for rotatably positioning said connection drill means at said selected angle around the longitudinal axis of the pipe for drilling a connection hole at said selected angle.

4. A header machine for drilling specified hole patterns in pipe to form a header for use in heat transfer products, said header machine comprising:

(a) a machine base;
(b) a feed carriage movably mounted on said machine base for movement forwardly and rearwardly relative to said machine base;
(c) feed clamp means mounted on said feed carriage for selectively clamping and unclamping a pipe to be processed by said header machine;
(d) hold clamp means mounted on said machine base for holding the pipe during the processing of the pipe;
(e) first drill means movably mounted on said machine base for drilling spud holes in the pipe;
(f) feed carriage positioning means for moving said feed carriage into selected positions to carry the pipe into chosen positions for drilling by said first drill means to form one or more spud holes in the pipe; and
(g) double circuit means for moving said first drill means in a selected pattern to form a double circuit pattern of spud holes in the pipe.

5. The header machine of claim 2 which includes cut-off saw means mounted on said machine base for cutting the pipe to a specified length.

6. A header machine for drilling specified hole patterns in pipe to form a header for use in heat transfer products, said header machine comprising:

(a) a machine base;
(b) a feed carriage movably mounted on said machine base for movement forwardly and rearwardly relative to said machine base;
(c) clamp means mounted on said feed carriage for selectively clamping and unclamping a pipe to be processed by said header machine;
(d) first drill means movably mounted from said machine base for drilling spud holes in the pipe;
(e) connection drill means mounted on said machine base and rotatably positionable around the longitudinal axis of the pipe independently of said first drill means for selectively drilling one or more connection holes in the pipe;
(f) feed carriage positioning means for positioning said feed carriage, said feed carriage positioning means comprising a first drive control unit and first actuating means operably coupling said first drive control unit to said feed carriage for moving said feed carriage into selected positions to carry the pipe into chosen positions for drilling by said first drill means to form one or more spud holes in the pipe, and (g) computer control means operably coupled to said feed carriage positioning means for controlling the movement of said feed carriage.

7. A header machine for drilling specified hole patterns in pipe to form a header for use in heat transfer products, said header machine comprising:

(a) a machine base;
(b) a feed carriage movably mounted on said machine base for movement forwardly and rearwardly relative to said machine base;
(c) clamp means mounted on said feed carriage for selectively clamping and unclamping a pipe to be processed by said header machine;
(d) first drill means movably mounted from said machine base for drilling spud holes in the pipe;
(e) feed carriage positioning means for positioning said feed carriage, said feed carriage positioning means comprising a first drive control unit and first actuating means operably coupling said first drive control unit to said feed carriage for moving said feed carriage into selected positions to carry the pipe into chosen positions for drilling by said first drill means to form one or more spud holes in the pipe, said first actuating means including a stepper motor and a ball lead screw operably coupling said stepper motor to said feed carriage, and
(f) computer control means operably coupled to said feed carriage positioning means for controlling the movement of said feed carriage, said computer control means including computer means for receiving data relative to the parameters of a header order to be processed by the header machine and for creating a program from such data, said computer means further including interface card means responsive to said program and operably coupled to said first drive control unit for directing the movement of said feed carriage.

8. The header machine of claim 7 which includes connection drill means movably mounted on said machine base for selectively drilling one or more connection holes in the pipe, said connection drill means including connection drill rotation means for rotatably positioning the connection drill means, said connection drill rotation means comprising a second drive control unit and second actuating means operably coupled to said second drive control unit for rotating said connection drill means to a selected angle around the longitudinal axis of the pipe for drilling a connection hole at said selected angle, and in which said interface card means is operably coupled to said second drive control unit for directing the rotation of said connection drill means.

9. The header machine of claim 8 in which said second actuating means includes a connection drill stepper motor, a worm screw driven by said connection drill stepper motor, and a ring gear engaged by said worm screw.

10. The header machine of claim 9 which includes double circuit means for moving said first drill means in a selected pattern to form a double circuit pattern of spud holes in the pipe.

11. The header machine of claim 10 which includes cut-off saw means mounted on said machine base for cutting the pipe to a specified length.

12. The header machine of claim 11 in which said computer control means includes a programmable logic controller responsive to said interface card means; and in which is included valve means controlled by said programmable logic controller for actuating said clamp means, for actuating said spud drill means, for actuating said connection drill means, and for actuating said cut-off saw means.

13. The header machine of claim 12 in which said double circuit means includes a double circuit stepper motor means operably coupled to said spud drill means for moving said spud drill means and which includes a third drive control unit responsive to said programmable logic controller and operably coupled to said double circuit stepper motor means for the drive thereof.

14. The header machine of claim 1 which includes cut-off saw means mounted on said machine base for cutting the pipe to a specified length.

15. The header machine of claim 14 in which said computer control means includes a programmable logic controller responsive to said interface card means; and in which is included valve means controlled by said programmable logic controller for actuating said clamp means, for actuating said spud drill means, for actuating said connection drill means, and for actuating said cut-off saw means.

16. The header machine of claim 15 in which said double circuit means includes a double circuit stepper motor means operably coupled to said spud drill means for moving said spud drill means and which includes a third drive control unit responsive to said programmable logic controller and operably coupled to said double circuit stepper motor means for the drive thereof.

* * * * *